(12) United States Patent
Berlin et al.

(10) Patent No.: US 6,314,334 B1
(45) Date of Patent: Nov. 6, 2001

(54) METHOD AND AUTOMATED SYSTEM FOR ANALIZING A SURFACE AREA TO PROVIDE A DETAILED MATERIAL SPECIFICATION FOR FITTING AND CUTTING MATERIAL TO BE DISPOSED ON THE ANALIZED SURFACE AREA

(75) Inventors: Marvin Berlin, Southfield, MI (US); Yehiel Goldstein, Petach-Tikvah (IL)

(73) Assignee: MeasureComp, Oak Park, MI (US)

( * ) Notice: Subject to any disclaimer, the term of this patent is extended or adjusted under 35 U.S.C. 154(b) by 0 days.

(21) Appl. No.: 09/056,462

(22) Filed: Apr. 7, 1998

(51) Int. Cl.$^7$ .................................................. G06F 19/00
(52) U.S. Cl. ............................................ 700/134; 700/97
(58) Field of Search ............................ 700/130, 131–136, 700/95, 97, 117

(56) References Cited

U.S. PATENT DOCUMENTS

| | | | |
|---|---|---|---|
| 4,023,861 | * | 5/1977 | Schnell ...................................... 299/1 |
| 4,849,911 | * | 7/1989 | Campian ................................ 364/521 |
| 4,905,159 | * | 2/1990 | Loriot ..................................... 700/130 |
| 5,255,207 | * | 10/1993 | Cornwell ............................... 364/512 |
| 5,353,355 | * | 10/1994 | Takagi et al. ............................. 382/8 |
| 5,555,629 | * | 9/1996 | Leighton .................................. 33/17 |
| 5,571,684 | * | 11/1996 | Lawrence et al. ........................ 435/18 |
| 5,663,885 | * | 9/1997 | Stahl ..................................... 700/134 |
| 5,815,398 | * | 9/1998 | Dighe et al. ........................... 700/217 |
| 5,847,971 | * | 12/1998 | Ladner et al. ......................... 700/131 |
| 6,024,150 | * | 2/2000 | Kawai et al. .......................... 156/518 |

* cited by examiner

Primary Examiner—Thomas Lee
Assistant Examiner—RiJue Mai
(74) Attorney, Agent, or Firm—Kohn & Associates (57) ABSTRACT

A system is disclosed employing a programmable computer system for preparing a detailed material cutting specification for cutting material and fitting the cut material into a given area. The system includes means for defining dimensions of the given area by inputting information regarding the dimensions of the given area to the programmable computer system and means for defining at least one dimension of the material by inputting information regarding the materials to the programmable computer system. The system further includes means for analyzing the dimensions of the given area as a function of the at least one dimension of the material to identify the placement of strips of the material and material fillers used in covering the given area with the material. The analyzed dimensions are reported to the user as a list indicating the quantity of material needed to cover the given area and a visual display of the material layout within the given area. A method for accomplishing the present system is also provided.

16 Claims, 10 Drawing Sheets

METHOD AND AUTOMATED SYSTEM FOR ANALIZING A SURFACE AREA TO PROVIDE A DETAILED MATERIAL SPECIFICATION FOR FITTING AND CUTTING MATERIAL TO BE DISPOSED ON THE ANALIZED SURFACE AREA

TECHNICAL FIELD

This invention relates to a method and system for preparing a detailed material cutting specification for cutting the material and fitting the cut material into a given area. While the invention relates to fitting cut material into areas of predetermined shape, and consequently has broad application thereto, the invention is particularly described in connection with the fitting of cut rolled goods, such as carpet or linoleum onto floor areas.

BACKGROUND ART

When estimating the amount of carpet needed to cover a given area, one must typically measure the dimensions of the given area to obtain a first set of visual indicia, preferably in the form of a rough diagram with each length along the perimeter of the area dimensioned. The dimensions of the given area can be measured in any number of fashions, including stretching a tape measure along each edge of the floor to be covered.

Once this is accomplished, it is necessary to fit the carpet to the area. This typically involves the practice of optimizing seam locations and minimizing waste. This is generally done by an experienced estimator who works with pencil, scratch pad and his/her experience to determine how many yards of the carpet are necessary to complete the job and also, how the carpet is to be cut and fit to install the job.

Estimating errors are particularly costly. If an error is on the high side, the customer either purchases too much carpet, or the customer receives a lower estimate and goes with a different carpet company. If the error is on the short side, insufficient flooring is ordered and the job can often not be properly installed.

One attempted solution to the above problem is described in U.S. Pat. No. 4,428,056. The '056 patent describes a method and apparatus for producing a detailed plan by interaction between an operator and a plotting system. The plotter of the system is manually manipulated by an experienced estimator to establish the initial seam position. If the initial seam position is improperly located, the method and apparatus allow the experienced estimator to manually select a new seam position. The method and apparatus also allow the experienced estimator to identify compatible source and target areas for scrap.

The '056 method and apparatus still require the use of an experienced estimator to input information through the plotter. In the case of high volume carpet or floor covering retailers, a large number of such experienced estimators is required to process all of the orders to be filled.

Whether carpet companies employ a completely manual system or a system such as the one disclosed in the '056 patent, experienced estimators are required. Unfortunately, experienced estimators are becoming more and more difficult to find. In addition, the personal experience these estimators rely upon to make their measurements is becoming a lost art that has not been passed onto the next generation.

Consequently, there is a need to provide a fully automated method and system for preparing a detailed material cutting specification used to cut and fit the material into a given area.

SUMMARY OF THE INVENTION

An object of the present invention is to provide a fully automatic method and system for preparing a detailed material cutting specification for cutting the material and fitting the cut material into a cut area.

Another object of the present invention is to provide a method and system for preparing a detailed material cutting specification for cutting the material and fitting the cut material into a given area without the need of an experienced estimator.

Yet still another object of the present invention is to provide a method and system for preparing a detailed material cutting specification for cutting the material and fitting the cut material into a given area without the need for substantial manual interaction, thereby eliminating human error.

These objects are achieved by providing a system employing a programmable computer system for preparing a detailed material cutting specification for cutting material and fitting the cut material into a given area. The system includes means for defining dimensions of the given area by inputting information regarding the dimensions of the given area to the programmable computer system and means for defining at least one dimension of the material by inputting information regarding the materials to the programmable computer system. The system further includes means for analyzing the dimensions of the given area as a function of the at least one dimension of the material to identify the placement of strips of the material and material fillers used in covering the given area with the material. The analyzed dimensions are reported to the user as a list indicating the quantity of material needed to cover the given area and a visual display of the material layout within the given area. A method for accomplishing the present system is also provided.

Other objects and advantages of the present invention will become apparent from the following detailed description when viewed in conjunction with the accompanying drawings, which set forth certain embodiments of the invention.

DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
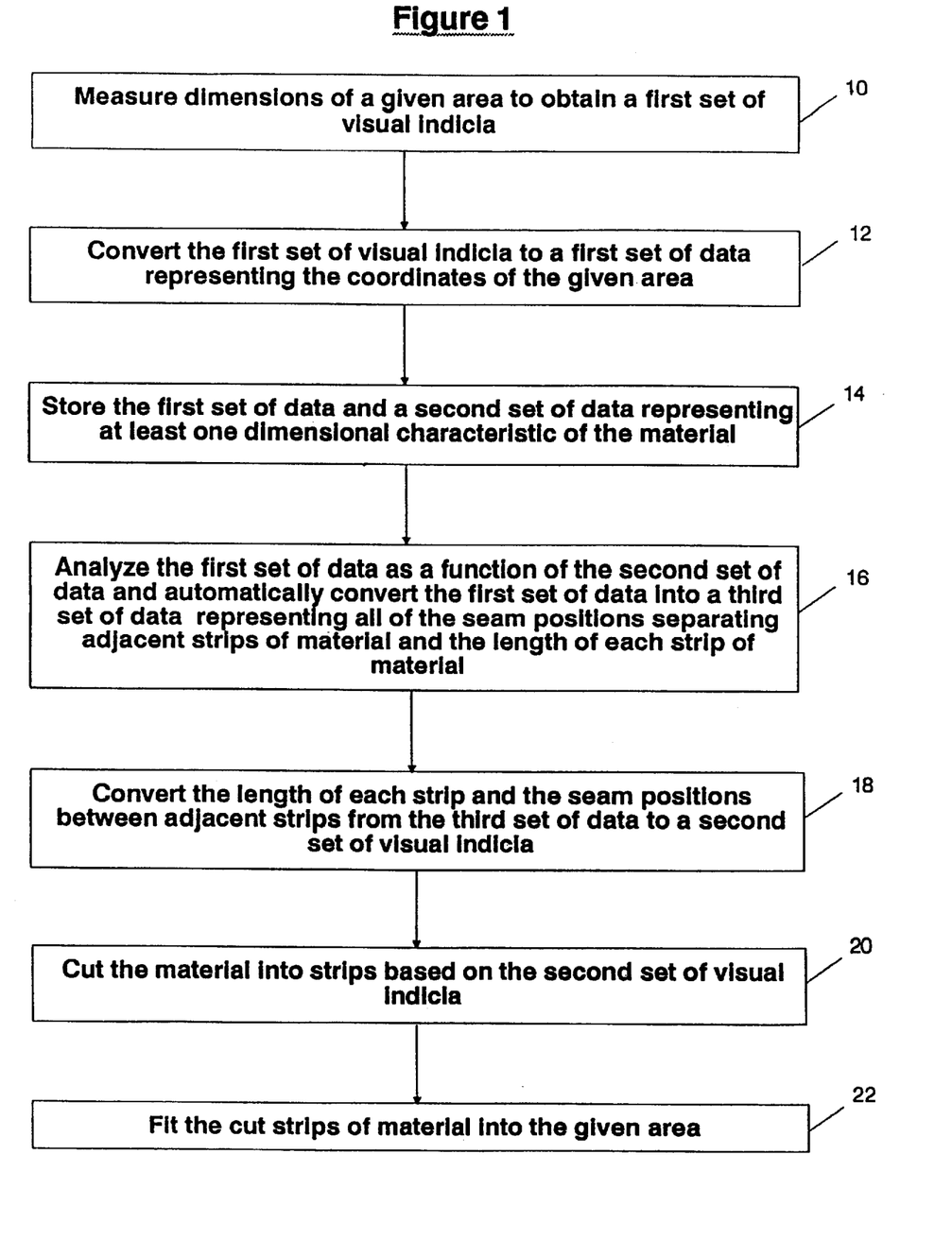
FIG. 1 is a block diagram flow chart illustrating various steps for use in one embodiment of the present invention.

With reference to the drawing figures, FIG. 1 shows, in block diagram form, the steps performed in practicing the present invention. The present invention is designed to optimize the process of fitting a cut materials into a given space. More specifically, the present invention optimizes the process of laying flooring, for example, carpeting or linoleum, to reduce seams, waste and fillers. In accordance with the preferred embodiment of the present invention, the method and system employ a programmable digital computer system including a memory, a CRT display, a central processor, an input for supplying graphical data to the computer system, such as a mouse, a light pen, a scanner or the like. Preferably, the central processor is connected to an alphanumeric keyboard, which provides another mechanism for operator entry of information into the computer system.

Figure 2:
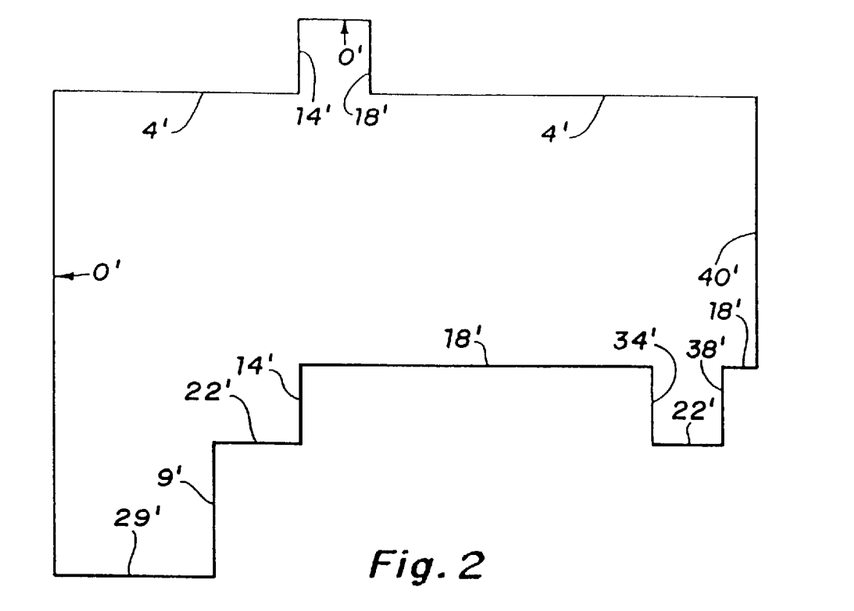
FIG. 2 illustrates a plan of a given area to be covered which may be drawn on the screen of a CRT of the system of the present invention.

With reference to block 10 in FIG. 1, the dimensions of a given area, such as that indicated in FIG. 2, are initially measured to obtain a set of visual indicia. For example, the visual indicia may be a rough diagram of the area with each length along the perimeter identified. Alternately, the initial measurements may simply be input to the computer system, thereby skipping the step of writing the measurements down on a sheet of paper.

Figure 3:
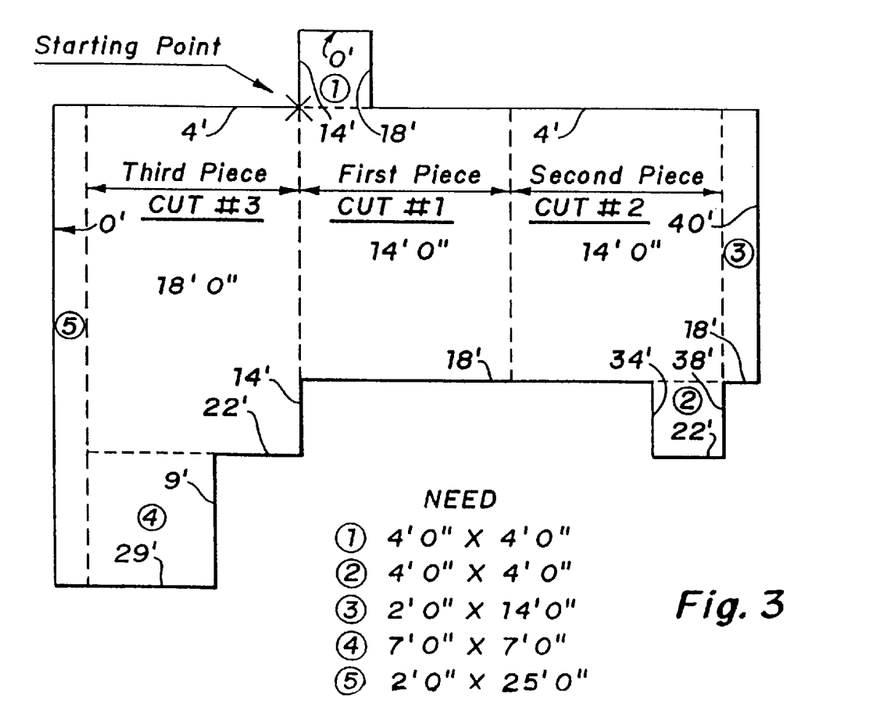
FIG. 3 is similar to FIG. 2 with the various major carpet strips specified and other minor carpet strips specified.
Figure 4:
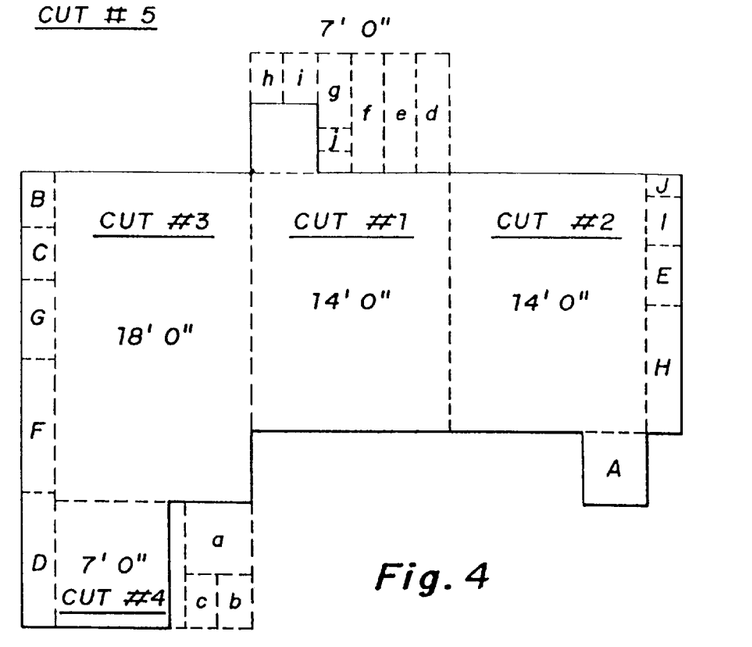
FIG. 4 is similar to FIG. 3 with various source and designation carpet areas specified.
Figure 5:
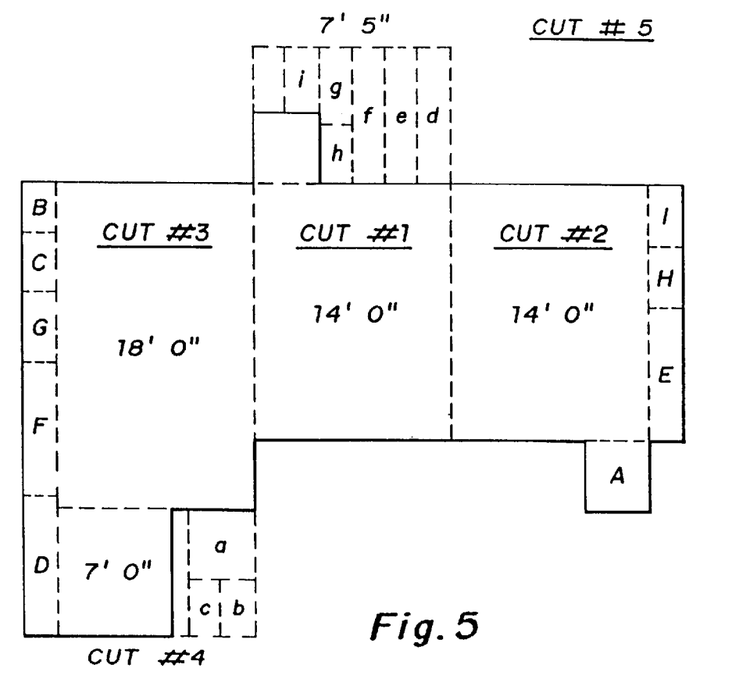
FIG. 5 is similar to FIG. 4 except the source and target carpet areas have been modified.
Figure 6:
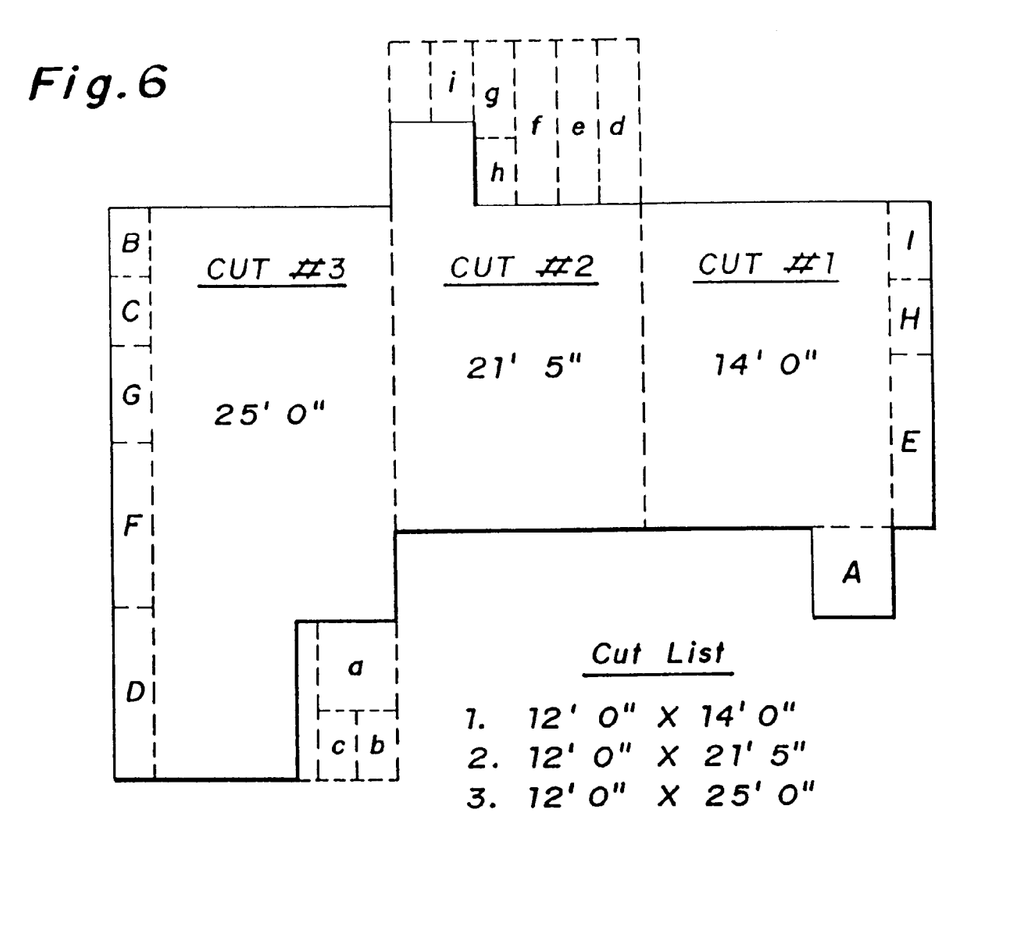
FIG. 6 is similar to FIG. 5 except a cut list is also included.

The set of visual indicia is then converted to a first set of data representing the coordinates of the given area (12). The coordinates may be input by using a mouse, light pen or keyboard arrows to draw the given area on the screen of the CRT of the computer system. An outline of an exemplary area is illustrated in FIG. 2. The system directs the user to select a starting point, as illustrated in FIG. 3, from which the user inputs dimensions about the periphery of the given area until the user returns to the starting point. The system is arranged to accept these signals in familiar units, such as feet and inches. In this way, the system may apply a desired scale factor relating to the scale and the material cutting specification to be produced. In addition, the units are employed to create an array of signals defining the coordinates of the given area (14).

At block 16 of FIG. 1, the first set of data representing the coordinates of the given area is analyzed as a function of the dimensional characteristic of the material 9 being laid in the defined space (for example, the width of a piece of carpeting). The dimensional characteristics of the material being laid are stored as the noted second set of data.

The first set of data is then automatically converted into a third set of data representing all of the seam positions separating adjacent strips of material, and the length of each strip of material. That is, the system analyzes the first set of data representing the physical dimensions of the space in which the carpet or other material is to be laid as a function of the material width and length to identify the optimum arrangement for the material within the defined space. The system employs a series of iterations to arrive at the optimum arrangement for the material in a manner that will be discussed in greater detail below.

At block 18 of FIG. 1, the length of each strip of material and the seam positions between adjacent strips are converted from the third set of data to another set of visual indicia, which may be displayed on the CRT and/or printed out via a printer coupled to the central processor. The material is then cut into strips (20, 22) based upon the material cutting specification printed in step 18 and, thereafter, fit into the given area to cover the area.

Figure 7A:
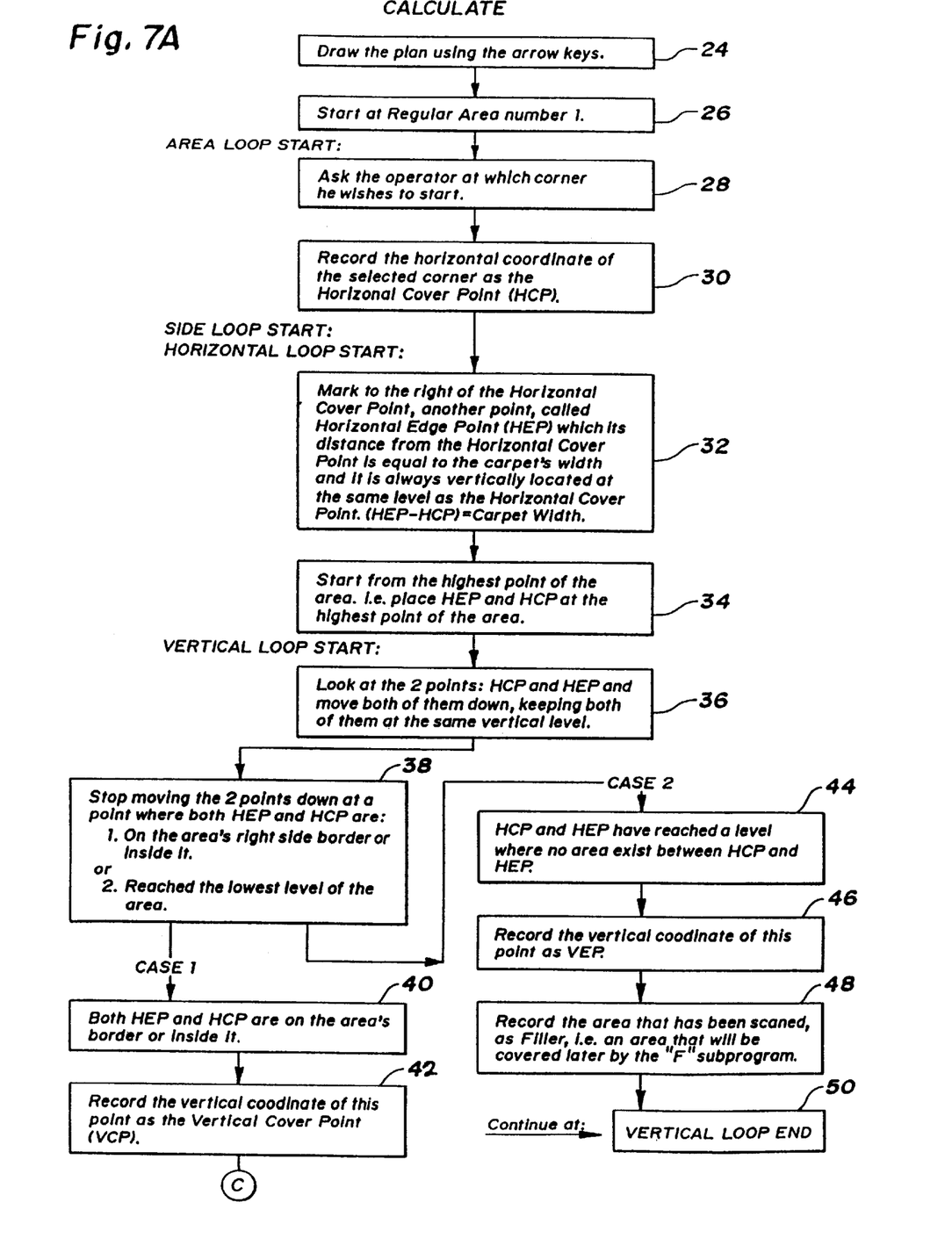
FIG. 7A is a block diagram flow chart illustrating a first half of a calculate routine for use in calculating the strips of material.
Figure 7B:
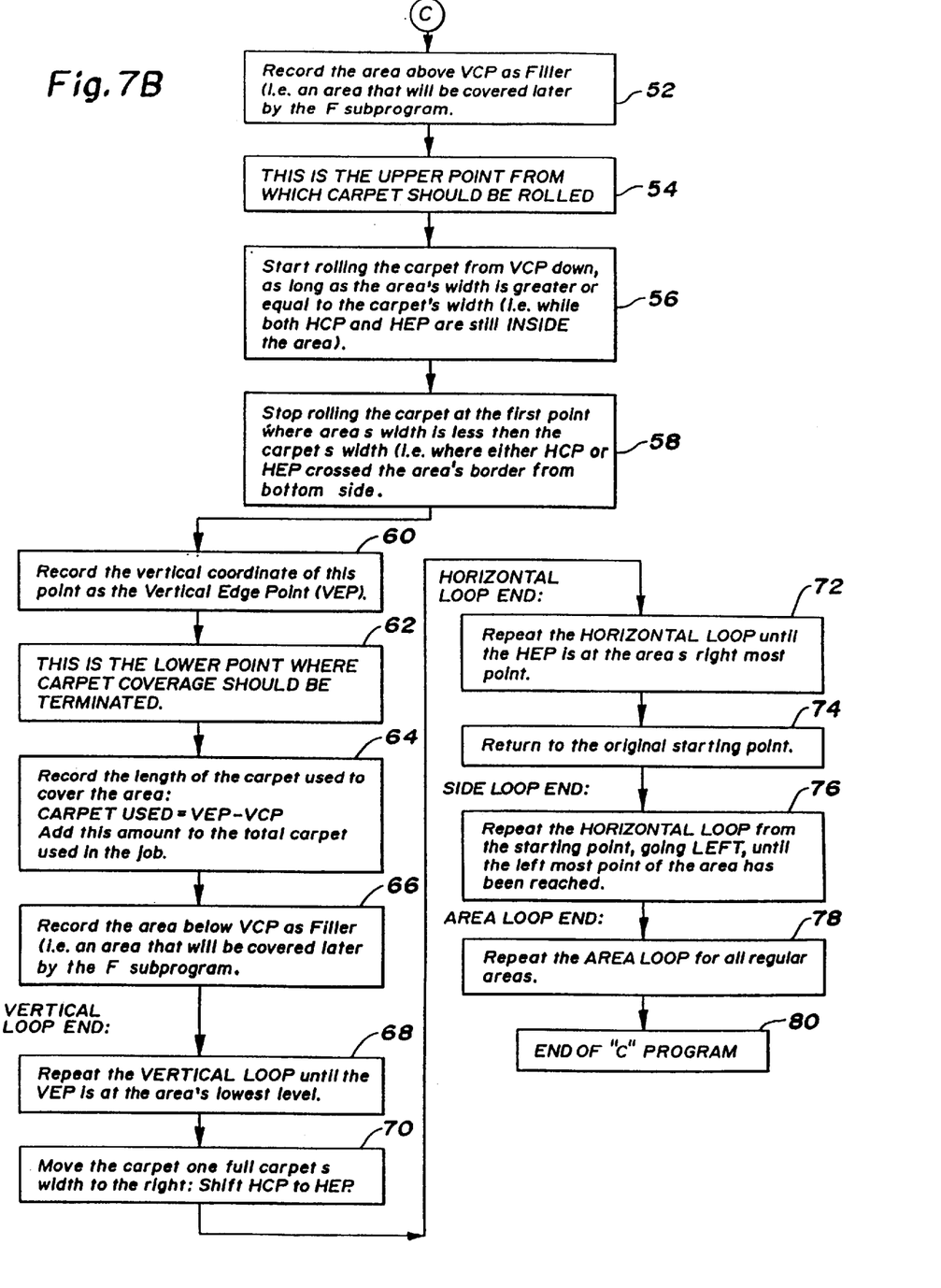
FIG. 7B is a block diagram flow chart illustrating a second half of the calculate routine.

With reference to FIGS. 7a and 7b, together with FIGS. 2 and 3, the details of the automated method used in accordance with the present method and system for preparing a detailed material cutting specification are disclosed. The automated method is facilitated by a computer program used in conjunction with the computer system to perform the present method and system. FIGS. 7a and 7b represent a calculate routine of the computer program used to identify the appropriate seams and fillers in laying out the carpeting in the given area. The present method will be described by way of example employing a carpet having a width of 12 feet 0 inches.

The outline of the given area to be covered is first drawn on the CRT, utilizing the mousing, light pen or arrow keys of the alphanumeric keyboard to input appropriate information to the computer system (24). The dimensions of the plan are given on a running measurement basis. As discussed above, the outline of the given area is input by determining a starting point, and subsequently measuring and inputting the length of each segment.

The program initiates the process by starting at an area number 1 (26). At step 28, the program asks the operator at which corner of the plan he or she wishes to start. That is, the program asks the user to identify the position along the plan that he or she wishes to begin laying the carpet. As indicated in FIG. 3, the starting point is a corner marked with an "X".

The starting point may be chosen from a wide variety of positions and a user is not limited to a specific location. However, the individual using the present program should possess sufficient expertise to pick a reasonable starting point. Once the starting point is chosen, the program determines the direction in which the carpet should be rolled. For example, where the starting point is chosen as shown in FIG. 3, the program would invariably determine that the carpet should be rolled down in the room. If, on the other hand, a starting point along a side wall was chosen, the program would determine that the carpet should be rolled across the room. While the present program does not provide for automatically establishing the starting point, the program may be modified to provide this feature without departing from the spirit of the present invention.

At step 30, the horizontal coordinate of the selected starting point is recorded as a horizontal cover point (HCP). The program then marks to the right of the horizontal cover point another point called the horizontal edge point (HEP) whose distance from the horizontal cover point is equal to the carpet's width and is always vertically located at the same level as the horizontal cover point (32). In other words, HEP−HCP=the carpet width, where the horizontal coordinates of the HEP and HCP are considered. For example, if the horizontal coordinate of the HCP is at 14 feet, 0 inches and the carpet width is 12 feet, 0 inches, the horizontal coordinate of the HEP is 26 feet, 0 inches (or HEP=HCP+ carpet width). As such, if the carpet is laid on the floor, its left side would be at a horizontal coordinate of 14 feet, 0 inches and its right side would be at a horizontal coordinate of 26 feet, 0 inches.

Once the HCP and the HEP are established, the preprocessing stage is entered. The preprocessing stage is designed to cover the area while generating the least number of fillers, seams and waste. In doing so, the program acts like a paint brush stroking the area to efficiently cover it, while creating the fewest number of spaces requiring later filling. As will become more apparent from the following disclosure, the program may choose to continue moving the HCP and the HEP down after the lowest level of the area has been reached if the program determines that doing so would result in reduced seams and waste.

The program starts from the highest point (that is, highest vertical coordinate) of the given area to position the HEP and HCP at the highest point in the given area (34). With reference to the example provided in FIGS. 2 and 3, the HCP and HEP move to the top of the plan at the 0 foot, 0 inch position. At step 36, the program looks at the two points HCP and HEP and moves them both down, keeping them at the same vertical level. The program stops moving the HCP and the HEP at a point where both HEP and HCP are either on the area's right side border, or inside it, or they have reached the lowest level (that is, the lowest vertical coordinate) of the area (38).

At step 40, in the first case scenario, both the HEP and HCP are on the area's border or inside it. Between steps 40 and 42 in the example of FIGS. 2 an 3, the program stops at the vertical coordinate 4 feet, 0 inches, because at this level both the HCP and HEP are inside the plan. Consequently, case 1 has been selected. The program records the vertical coordinate of this point (i.e., 4 feet, 0 inches) as the vertical cover point(VCP)(42).

Case 2 is entered from block 38, as indicated at block 44 when HEP and HCP have reached a level where no area exists between the HCP and the HEP. When this occurs, the program records the vertical coordinate of this point as vertical end point (VEP)(46). The scanned area is then recorded as a filler (that is, the area that will be covered by a filler subprogram). At block 50, the program continues at a vertical loop end, as indicated in FIG. 7b.

Continuing on with the description of Case 1 as illustrated in FIG. 7b at step 52, the program records the area above VCP as a filler (that is, area that will be covered later by the filler subprogram). In the example of FIGS. 2 and 3, filler No. 1 is four feet by four feet. The program then indicates that the vertical position of 4 feet 0 inches is the new VCP from which the carpet should be rolled (54). The program simulates the rolling of the carpet from the new VCP down, as long as the area's width is greater or equal to the carpet's width (that is, while both the HCP and the HEP are still inside the area)(56). Again, in the examples of FIGS. 2 and 3, the HCP is running down at a coordinate of 14 feet, 0 inches while the HEP is running down at a coordinate of 26 feet, 0 inches.

The program stops rolling the carpet at the first point where the area's width is less than the carpet's width (58). In other words, where either the HCP or HEP crosses the area's border from the right, left or bottom, the program stops rolling out the carpet. In the example illustrated in FIG. 2 and 3, the carpet stops running down a vertical coordinate of 18 feet, 0 inches, at which point the HCP and HEP go out of the border's area. The program records the vertical coordinate of this point (VEP) (60). In the example, the VEP equals 18 feet. The program then indicates that this is the point where carpet coverage should be terminated. Carpet is, therefore, laid from VEP=4 feet to VEP=18 feet in accordance with the example of FIGS. 2 and 3.

At step 64, the program records the length of the carpet used to cover the area. The carpet used is equal to VEP−VCP. This amount is added to the total carpet used in the job. In the present example, the carpet used is equivalent to VEP−VCP which is equivalent to 18 feet−4 feet, or 14 feet. The total carpet used at this point is 0 plus 14 feet, which equals 14 feet.

At step 66, the program records a new VCP at 18 feet, 0 inches and the area below this VCP is recorded as a filler (that is, an area that will be covered later in the subprogram). The program repeats the vertical loop beginning immediately after block 34 until the VEP is at the area's lowest level (68). In the example, there is no area below this point and, therefore, no more fillers are recorded. At this point the program has reached the area's lowest level.

When the first strip of carpeting has been laid, the program simulates movement of one full carpet's width to the right (i.e., the HCP is shifted to the HEP) (70). In the example, moving the HCP to the HEP moves the HCP to 26 feet. This initiates a second layer of the carpet where its left hand side will be at 26 feet and its right hand side will be at 38 feet. At block 72, the program repeats the horizontal loop, which begins immediately after step 30, until the HEP is at the area's rightmost point.

What follows now is a description of a second pass through the horizontal loop. At step 32, the HCP is now at a horizontal position of 26 feet, 0 inches. The carpet width is 12 feet, so HEP=26 feet+12 feet=38 feet. This means that if the carpet is laid on the floor, its left side would be at 26 feet and its right side would be at 38 feet. At step 34, the HCP and the HEP will move to the top of the plan at the 0 foot level.

The program then proceeds through steps 36, 38 and 40 of the first case. The program stops at vertical level 4 feet 0 inch, because at this level both the HCP and the HEP are inside the plan with case 1 being selected. At step 42, the VCP is at 4 feet, 0 inches. At step 52, there is no filler area above this point, therefore no filler is recorded.

Then the program again proceeds to steps 54 and 56. In the example, the HCP runs down at the horizontal coordinate of 26 feet and the HEP runs down at a horizontal coordinate of 38 feet. At block 58, the program runs down at the vertical coordinate of 18 feet. At this level, the HCP is moving out of the area's border while the HEP is on the area's border. At step 60, the VEP is 18 feet. At step 62, the carpet is laid from VCP equals 4 feet to VEP equals 18 feet. At step 64, the carpet laid which is VEP−VCP is equivalent to 14 feet. The total carpet used is calculated at 14 feet plus 14 feet or 28 feet. The second piece of carpet was 14 feet long. Adding it to the total of 14 feet before, makes the total amount of 28 feet.

At block 66, the filler below the new VCP is 4 feet by 4 feet. This is recorded as filler No. 2. The program has now reached the area's lowest level (68).

The HCP is again moved to the HEP horizontal coordinate, thereby moving the HCP to 38 feet (70). This means that if the carpet is laid on the floor, its left side would be at 38 feet and its right side would be at 50 feet. The program will try to lay a third layer of carpet where its left hand side is at 38 feet. The horizontal loop is again repeated by going back to block 32 (72).

At step 34, the HCP and HEP again move to the top of the plan at the vertical zero foot level. The program then moves through steps 36, 38 and determines that the HEP is out of the area. This indicates that no area exists between the HCP and the HEP, and a filler will be required for the area between the HCP and the edge of the plan. The program then enters case 2 for calculating the size of the required filler. The program scans the plan from the top to the bottom and reaches a point where there is no more area (44). As such, the scanning stops at VEP equals 18 feet (46). At step 48, the filler is now recorded as filler number 3 with an area of 2 feet by 14 feet.

At step 50, the program continues at vertical loop end or immediately before step 68. At step 68, the program has reached the area's lowest level. During this vertical loop no carpet has been used.

At step 70, the HCP is moved to HEP. In other words, the HCP is moved to 50 feet. The HEP is moved to 62 feet. The HCP and HEP are outside of the rightmost point of the plan (72). No more carpet is needed at this side of the starting point. The program then proceeds to steps 74 and 76 where the program initiates the same procedure, but moves from the starting point to the left.

Returning to step 32, the HCP is at 14 feet. Since the carpet width is 12 feet, the HEP is 14 feet−12 feet, or two feet. This means that if the carpet is laid on the floor, its right side would be at the horizontal coordinate of 14 feet and its left side would be at the horizontal coordinate of two feet.

The HCP and the HEP move to the top of the plan at vertical zero level (34). Again, the program moves through steps 36 and 38. In the example, the program stops in Case 1 at step 40 at vertical level four feet, because at this level both the HCP and the HEP are inside the plan by selecting Case 1. The VCP is recorded at four feet (42). Since there is no plan area above this level, no filler is recorded (52). The HCP then runs down at a horizontal coordinate of 14 feet and the HEP runs down at a coordinate of two feet (56). The program stops running down at a coordinate of 22 feet (58), because the HEP and HCP are going out of the area's border at this level (58). The VEP is recorded at 22 feet (60).

The carpet is then laid from VCP=4 feet to VEP=22 feet (62). The carpet used is equal to VEP−VCP or 18 feet (64). The total carpet used is then 28 feet plus 18 feet or 46 feet.

The filler below the VEP is 7×7 (66). This will be recorded as filler number 4. The filler is recorded from the coordinate 2 feet and from the leftmost side since the leftmost side of the carpet at this time is at 2 feet. The program has reached the area's lowest level (68) and the HCP is moved to the HEP, moving the HCP to the horizontal coordinate of 2 feet, 0 inches (70).

At step 72, the horizontal loop at block 32 is again repeated. The HCP is at 2 feet. The carpet width is 12 feet. So HEP is 2 feet−12 feet, or −10 feet. This means that if the carpet is laid on the floor, its right side would be at 2 feet and its left side would be at −10 feet.

At step 34, the HCP and the HEP are moved to the top of the plan at the vertical zero foot level. Again, the program moves through steps 36, and 38, and enters Case 2. At step 44, the program scans the plan from the top of the plan to the bottom and reaches a point where there is no area. At step 46, the scanning stops at VEP=29 feet (48). A filler is now recorded. The filler number is 5 and the size is 2 feet by 25 feet.

After step 50 and at step 68, the program has reached the area's lowest level. During this vertical loop no carpet has been used. At step 70, the HCP is moved to the HEP moving the HCP to −10 feet. This moves the HEP to −22 feet. At step 72, both the HCP and the HEP are at the leftmost point of the plan. No more carpet is needed at this side of the starting point. No more area is required for this example (78). The total amount of carpet used 46 feet and a list of fillers as indicated at the lower portion of FIG. 3 is established (80). So far there are three seams as shown in FIG. 3.

Filler Routine:

Once the primary sections of the carpet have been determined and the areas requiring fillers have been determined, the system moves to determine how to fill the filler while utilizing the least amount of carpet.

Figure 8A:
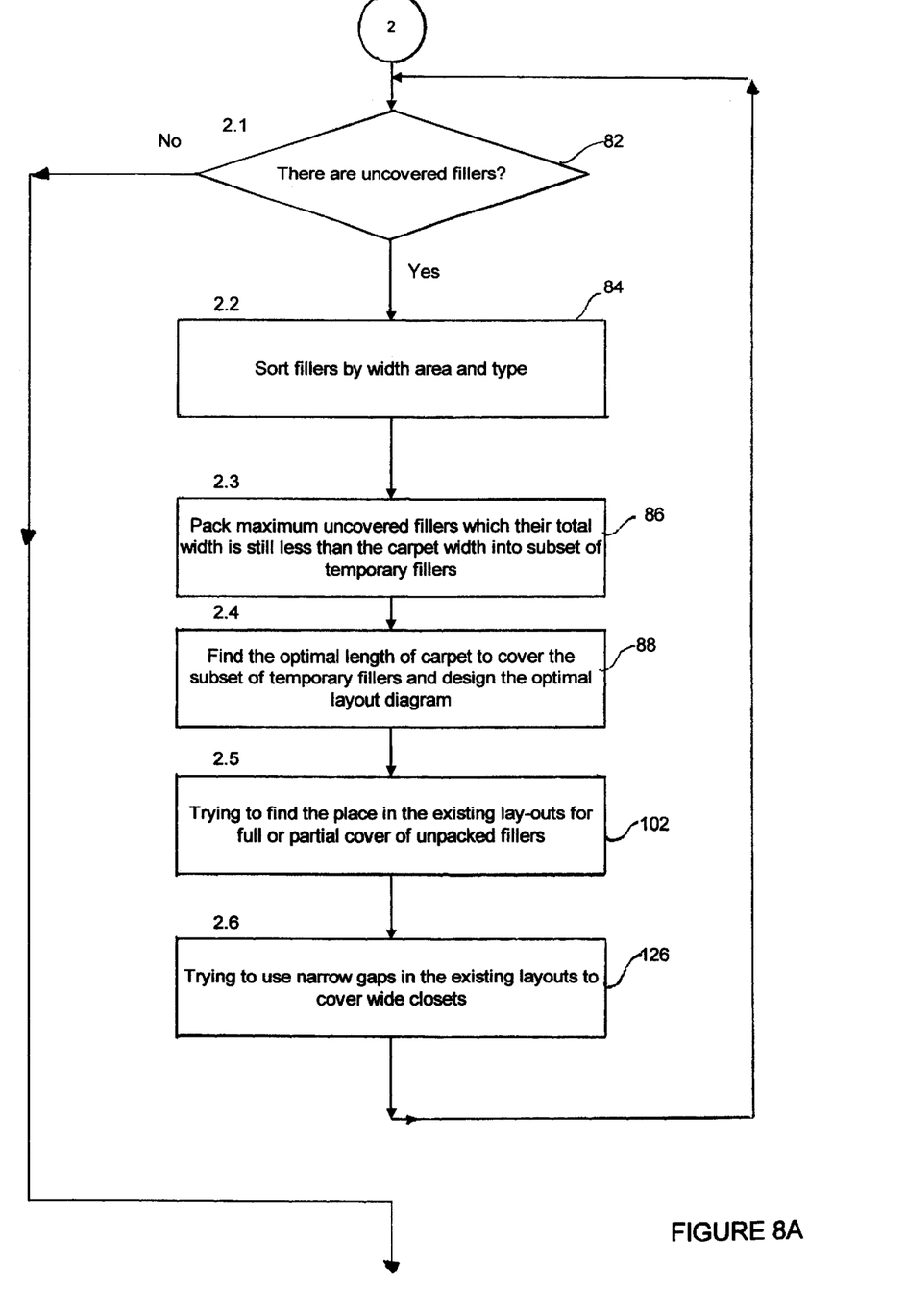
FIG. 8A is block diagram flow chart illustrating the primary filler routine.

As such, and with reference to FIG. 8a, the program first asks if there are uncovered fillers (82). If the answer is yes, the fillers are sorted by width area and type (84). For example, the fillers may be sorted as closet fillers, stair fillers, landing filler, etc. The program then groups the maximum number of uncovered fillers such that their width is less than the carpet width (86). Specifically, the program packs the uncovered fillers side by side until they equal the width of the carpet being laid. These groupings are subsets of the fillers list, called the temporary fillers.

Figure 8B:
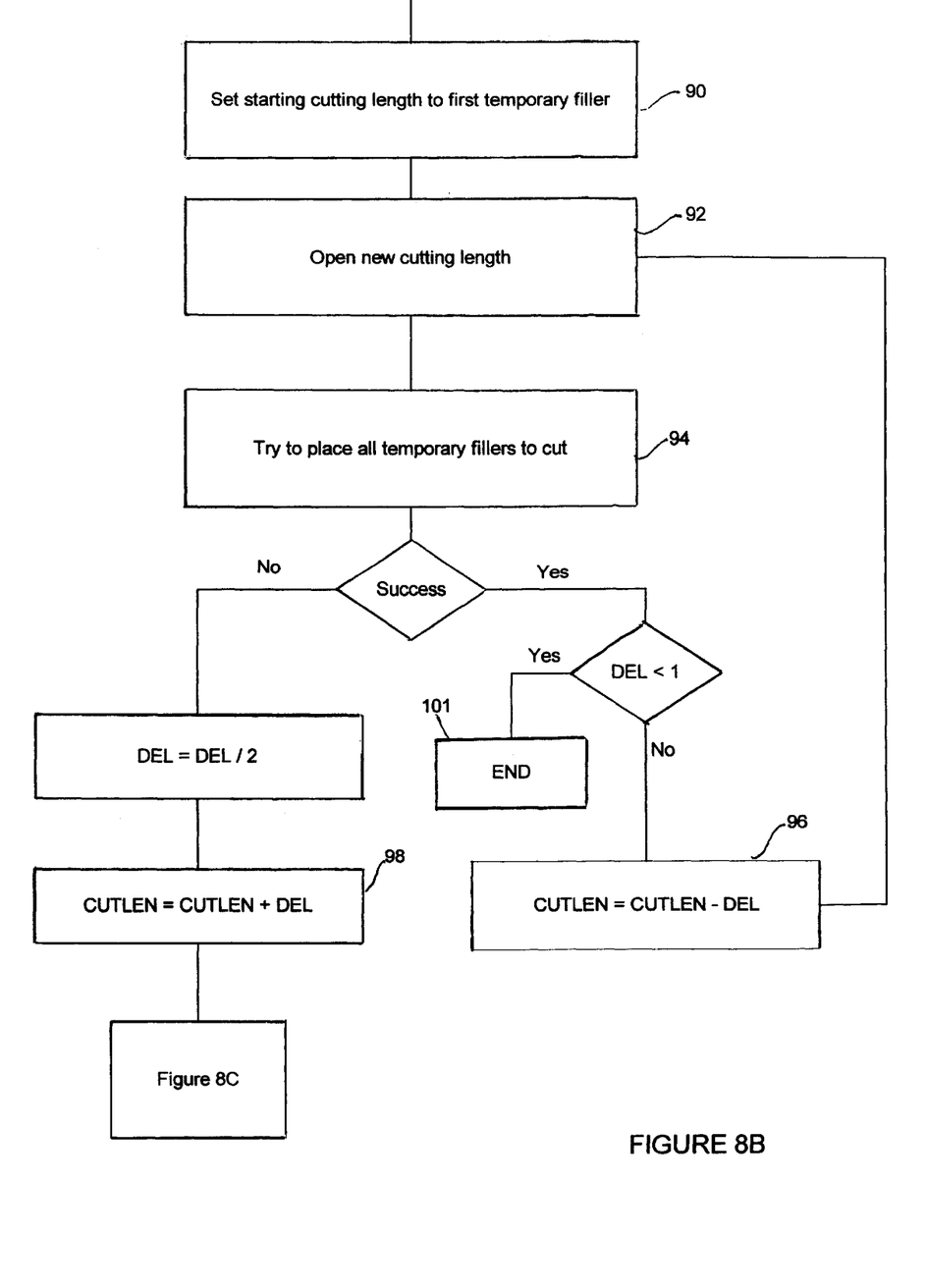
FIG. 8B is a block diagram flow chart illustrating a subroutine for the primary filler routine.

Once the subsets of temporary fillers are identified, the optimum length of carpet (that is, the carpet cutting length) to cover the subsets of temporary fillers, and design the optimal layout diagram, is determined (88). With reference to FIG. 8b, the carpet cutting length is determined by initially setting the carpet cutting length according to the first temporary filler subset (90). Specifically, the carpet cutting length, that is, the length of the carpet as it is rolled out, is initially set to equal the length of the longest filler in the temporary filler subset. This ensures 100% coverage of all the fillers found in the temporary filler subset. However, the fillers may generally be covered with less carpet than provided for above.

Therefore, the present program employs an iterative process that attempts to reduce the carpet cutting length to a minimum. This is accomplished by increasing/decreasing the carpet cutting length by a factor DEL. In accordance with the present embodiment, the carpet cutting length is set and DEL is initially set to 18" (92), although other initial settings may be employed without departing from the spirit of the present invention. The program first attempts to cover the fillers with the initial carpet cutting length (94). If the program is successful, the program then attempts to cover the fillers with less carpet, that is, CUTLEN (carpet cutting length)−DEL (96). If this reduced carpet cutting length is successful in covering the fillers, the program continues to reduce the carpet cutting length by DEL until the carpet cutting length is insufficient to cover the filler.

Figure 8C:
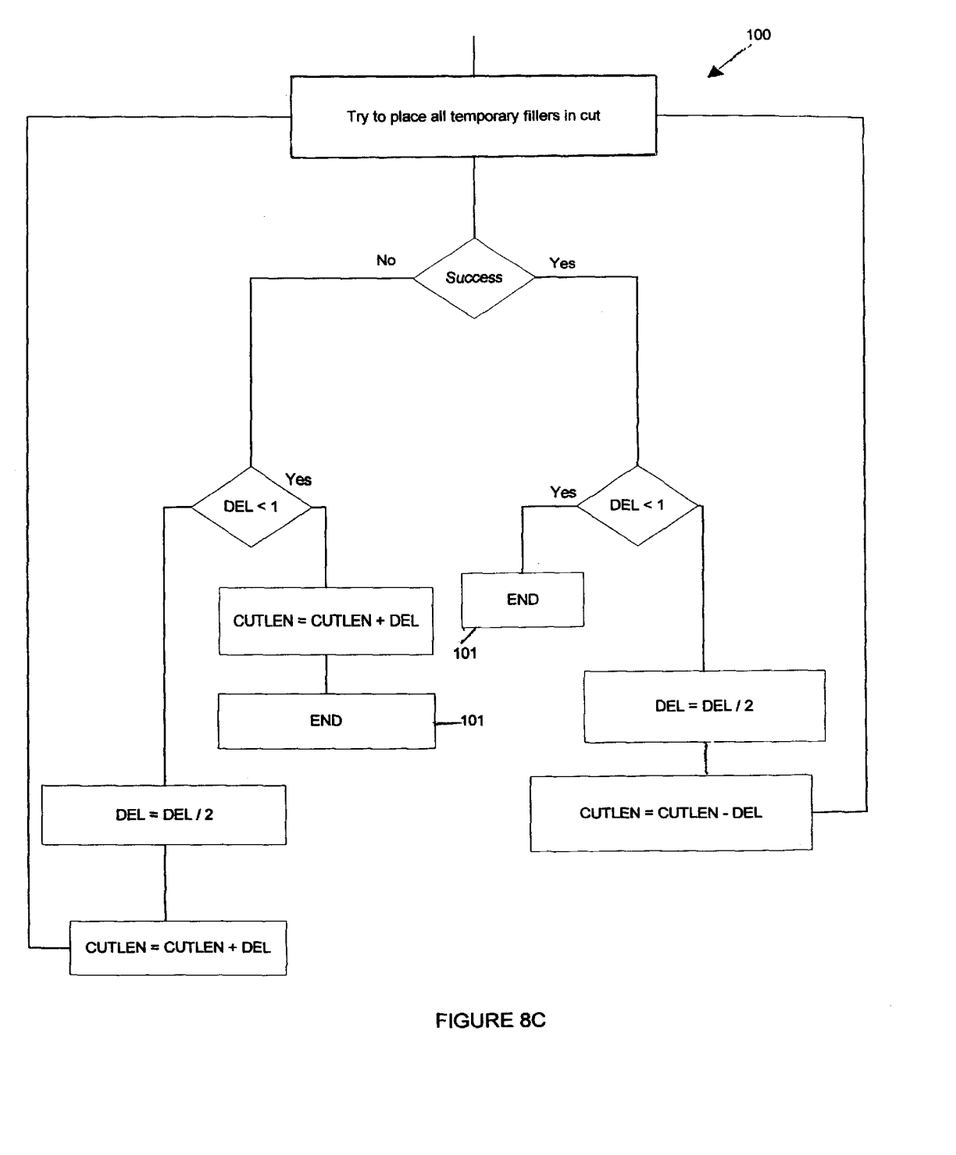
FIG. 8C is a block diagram flow chart illustrating a subroutine for the primary filler routine.

Once the carpet length reaches a point were the program is unable to cover the filler, the program increases the carpet cutting length. However, the program does not increase the carpet cutting length by DEL, but rather by one half DEL (that is, DEL/2) (98). With reference to FIG. 8c, the program then continues to adjust the cutting length until DEL<1" (100). At this point, the program determines that further calculations are unnecessary and ends the routine (101).

For example, if the CUTLEN fails to cover the fillers at 12 feet, the program would add 9" (DEL=18/2) to the CUTLEN to create a new CUTLEN of 12'9". If the length then covers the fillers, the program would then decrease the CUTLEN by 4.5" (DEL=9/2). Assuming the CUTLEN of 12'4.5" was not enough to cover the filler, the program would then increase the CUTLEN by 2.25" (DEL=4.5/2). Assuming the CUTLEN of 12'6.75" was enough to cover the filler, the program would reduce the CUTLEN by 1.125" (DEL=2.25/2). Assuming the CUTLEN of 12'5.625" was enough to cover the filler, the program would reduce the CUTLEN by 0.5625" (DEL=2.25/2). If the CUTLEN of 12'5.0625" was enough to cover the filler, the program would quit this routine, since the next DEL would be less than 1. If, however, the final CUTLEN was insufficient, the program would add the 0.5625" back to the CUTLEN and quit the routine.

The process described above is outlined in steps 90 to 101 shown in FIGS. 8*b* and 8*c*. Briefly, the CUTLEN and DEL are set at their starting points (90). For example, DEL is set at 18 and the new cut is made in accordance with the length of the CUTLEN (92) (for example, 15 feet). The program then attempts to place all the temporary fillers within the cut (94). If all of the pieces do not fit within the CUTLEN, the CUTLEN is set to equal the CUTLEN plus DEL, where the DEL=DEL/2 (98). At this point, the original sizes of the temporary fillers are restored and the filler subroutine 100 is entered. The filler subroutine iteratively adjusts the size of the carpet cutting length with approximately a one inch tolerance as shown above.

Figure 8D:
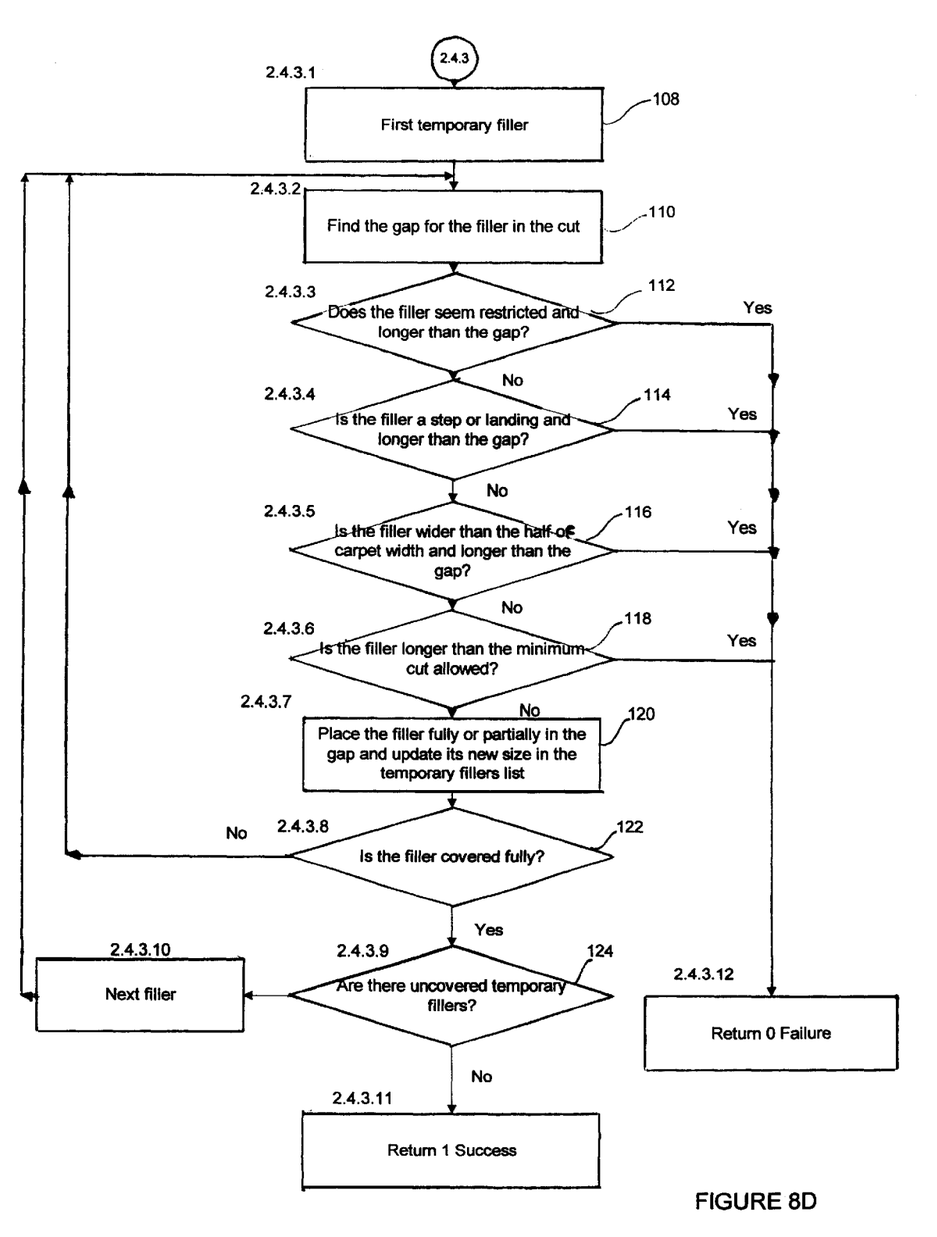
FIG. 8D is a block diagram flow chart illustrating a subroutine for the primary filler routine.

With reference to FIG. 8*d*, when the system attempts to place the temporary fillers into the carpet cutting length which the system considers, the system initially considers the first temporary filler subset (108). The system then asks a series of questions to determine whether success is achieved or not (110). Specifically, the system asks the following questions (a yes answer to any of these questions indicates a failure and the system goes to step 96): 1) is the filler seam restricted and longer than the filler gap (112)?; 2) is the filler a seam, a step or landing and longer than the filler gap (114)?; 3) is the filler wider than the half of carpet width and longer than the filler gap (116)?; and 4) is the filler longer than the minimum cut allowed (118)? If the answers to all of these questions is no, the filler is fully or partially placed in the gap and the system updates its new size in the temporary fillers list (120).

During the initial loop, the system then asks whether the filler is covered fully (122). If the answer is no, the system returns to step 110 and repeats the series of questions for other fillers. Specifically, the program will attempt to use the waste to cover other fillers in the being covered. In doing so, the program will attempt to place the waste in the least exposed areas. For example, the program will attempt to place the greatest number of waste pieces in the closet where the many seams created will not be regularly seen. If the filler is covered fully, then the system asks whether there are any uncovered temporary fillers remaining (124). If the answer is yes, the system returns to the step 110 and repeats the process for the next filler. If the answer is no, then the system determines that a success has been reached and moves on to step 100.

Once the packed fillers from the subsets of temporary fillers are determined, an attempt is made to find places in the existing layout for full or partial cover of the unpacked fillers (102). Once this is completed, narrow gaps in the existing layouts are used to cover wide closets (126). The unpacked fillers are positioned within closets and other unexposed spaces such that the grain of the carpet runs in the same direction. Specifically, carpet has an inherent grain and must be laid in the same direction across seams such that the differences in grain are not apparent. The program applies this concept in laying carpeting within closets, as well as in laying carpet through the area being covered. When the filling information is completed, the cut results are saved and a printout is provided to the user.

Pattern Matching System:

In addition to simply estimating the layout of carpeting which does not employ a pattern, the present system includes the ability to consider patterned carpeting. While providing a functionally useful system for laying patterned carpeting, the inclusion of present system may also be useful in determining the ideal layout for patterned wallpaper and flooring. The pattern matching system is also useful in ensuring that patterned carpeting used on the steps of the building is properly matched as it moves from step to step.

Application of the present system to prepare a layout for patterned carpeting takes place in much the same way as the method presented above for estimating the use of nonpatterned carpeting. However, where patterned carpeting is involved, the system considers the repeat distance of the pattern in determining the placement of seams and fillers in the layout. The program considers the repeat pattern along both the width and the length of the carpeting being laid. The matching of patterned carpeting is achieved by employing a coordinate base throughout the floor plan. This allows for exact placement of pieces of matched goods within a room and throughout rooms that are connected.

Where the same pattern is used in connected rooms, the rooms should be matched along the doorway. In addition, the program allows a user to indicate whether a closet should be matched with the remainder of the room. If the user chooses to match the closet with the remainder of the room, the closet is matched along both the length and the width of the patterned carpet.

The pattern matching system may also be employed in developing a plan for laying carpeting on stairs and landings. When the present program is employed in this way, the stairs and landings are matched by default along their widths, and not along the length of the pattern. However, the program may be altered to match along both length and width, to match only along the length or to not match at all.

When matching the width of the pattern on stairs, the edge of the width may start anywhere within the pattern, and should start at the same point in the pattern for each step. Matching along the width of the carpet is most commonly employed because many patterned carpets have a subtle pattern and one will likely not notice misalignment where one side of the width of a step does not start where the other side of the step ends in the pattern.

If such misalignment presents a problem, the user may change the width alignment default and align the exact center match of the pattern with the center of the width of the step. In this way, if a very noticeable pattern is being laid (this is often found in linoleum), the left edge of the step will look balanced with the right edge of the step.

As discussed above, when laying carpet on stairs, the program may be altered to match patterns along the length of the carpet. Where the pattern is matched along the length of the carpet, the bottom of the length of a step is matched to the top of the length of the next step. The user is able to change the setting to cause the top of the length of a step to start at the same point in the match as the top of the length of all steps in the set. This change may be applied with linoleum where material is only being installed on the tread of the steps, but not on the risers of the steps.

It should be understood that matching along the width of a pattern only occurs when the seams are connected in the manner described below. In use, the user must indicate which area is connected to the stairs or landing, and exactly where the connection is both on the area and the step or landing.

The general rule in the use of the program is if a staircase has no landing between the top and the bottom set of stairs, then the stairs should be matched along the width of the patterned carpet with the hall at the top and bottom of the stairs. This assumes the user is matching by the default along the width of the patterned carpet. However, the user might choose to match the length as well, in which case the default must be changed by the user.

Where the stairs connect to a floor being carpeted with the same pattern, the user must make sure to indicate that the stairs connect at the top at a given position long the top hall and at a given position, or corner, of the top step. The user must do the same for the bottom step if it connects to a bottom hall where the carpet is being laid.

If the staircase includes a landing between the bottom stairs and the top stairs, the top set of stairs is matched along the width of the carpet. Once again, this assumes the user is employing the default for matching along the width of the pattern. However, the user might choose to match the length as well, in which case the default must be changed by the user. After the top set of stairs are evaluated, the landing is matched with the top step along the width of the carpet. The lower stairs are then matched with the landing. In the event a landing exists between two areas with no steps, the landing is appropriately matched with both areas.

In a preferred embodiment of the program, the user is prompted to indicate which stairs, landings and areas go together, and the proper sequence for combining these elements.

General Features:

The present system provides a wide variety of features which help estimators accurately and efficiently prepare carpeting layouts for a wide variety of rooms. The system provides the carpet layer with a detailed layout of the carpeting to be placed on the floor of a building. The layout shows precisely how to piece the goods to complete any given room so that the installer sees how to cut the carpet and where to place pieces in the room.

Since the present system is very exact in its determinations, various modifications may be made to accommodate for variations due to slightly inaccurate measurements and carpet manufacturing. For example, 3 inches is added to any piece 10 feet or longer. In addition, the program may be set to calculate goods as if they were multiple inches less in width than the advertised width or the system may be set to limit the number of fill pieces in any given fill area unless the strips reach a 5 foot length. Further, the program may be set to force any strip used for a filler to be a minimum width regardless of the actual fill areas width.

Due to the exact nature of the present system, complicated rooms and multiple door projections might cause the system to come up with odd solution to the calculation of goods. The present system solves this by modifying the layout to a simpler form. Two basic things that are done to accomplish this modification are to (a) look at all walls with doors as if the entire wall is located at the position of the depth of the door and (b) remove all walls interior to a given room whose wall thickness match the wall thickness setting.

The system also provides for modifying the system rules to accommodate various seams and piecings, as well as how much piecing to allow for regular rooms, stairs and landings, and closets. The system further provides that no cross seams will be placed in a doorway, and fillers are optimally placed in the area in front of a door.

While the system may be utilized with both coordinate based and engineering based systems, more features are available when the coordinate based system is employed. As such the system provides for a method whereby a plan drawn in the engineering mode may be converted to a coordinate based system.

This conversion is a user initiated process. Since all areas of the plan are set to scale, the user first chooses all areas which are to use the same coordinate base. The user then sets the extreme corner to be the zero vertical coordinate and the zero horizontal coordinate. This causes the program to set the room measurements to a coordinate base. Lengths are then calculated by subtraction of the coordinates. Setting a new zero for the coordinate base initiates addition or subtraction from the internally saved coordinates to display the desired coordinate base. It should be noted that the method presented above assumes that rooms are moved to their proper position in relation to each other.

With the alignment of rooms in mind, the program permits a user to move rooms relative to each other. For example, the program permits two given areas to be spaced apart by the wall thickness between them. In addition, the program includes a feature to make two walls of two given rooms flush with each other. The program further includes a feature permitting the doors of two rooms to be locked together at their corners, creating two halves of the door between the two rooms. The door of each room is measured to a center position underneath the door. When each room is drawn with the program, the room is drawn with only one half of the doorway to the position underneath the door and the adjoining room is drawn with the other one half of the doorway.

Use of a coordinate based system allows the user to precisely position rooms relative to each other. As discussed above, the biggest benefit of converting a plan to coordinate base is for patterned goods calculation. As such, some of the conversion features include: aligning the position of parallel lines to create both sides of a wall set to the wall thickness setting; aligning the position of two lines to be flush (that is, the entire moves as a result); drawing each room having half of the actual doorway (as such, the two halves of the two rooms meet to create the full doorway and the user can cause one area's half door to slide along the wall to meet exactly the position of the other room's half door); and the use of the three features presented above in helping to line up given areas into position before measurements are given.

For coordinate based measuring lines which all parallel each other by a user defined setting, it is assumed that input of one side of a wall will automatically cause the opposite side wall to receive a coordinate equal to the wall thickness difference. Walls that are flush, or within the user defined setting of being close to flush, are assumed to have the same coordinates so that input of one causes the same coordinate to be given to the other. This is true with engineering based measuring, however, the coordinate based measuring shows the user which walls will be affected by a given input and allows the user to change the walls to be affected before proceeding. In this way, two sides of a wall only require one input if the other side is within the user defined pixel distance of the input line.

The present system allows one decision per enclosed area per placement of the edge of the carpet for calculation. Consecutive pieces of carpet are laid side by side after that decision. In some cases it is necessary to lay large runs of goods differently within one area. This is particularly true if multiple rooms are drawn as one enclosed area. The break feature and its reverse, the combined feature, accomplish this. Therefore, the break feature allows a different part of the area to be looked at as a separate enclosed area allowing the user to place carpet separately for that area. The combine feature undoes what the user did with the break feature.

Additionally, users who find it much faster drawing an entire floor of rooms as one enclosed area now have the option of breaking each room off into separate areas after measuring input by placing a door at the proper position as the last step.

The present system also provides for labels within areas to identify them. The system also permits islands that is, a free standing counter in the center of a room or a staircase in the center of an upstairs hall, to be accounted for in the calculation of the appropriate carpet layout. As a result, waste created by incorporating an island into a floor plan may be used in filling other areas.

While various preferred embodiments have been shown and described, it will be understood that there is no intent to limit the invention by such disclosure, but rather, is intended to cover all modifications and alternate constructions falling within the spirit and scope of the invention as defined in the appended claims

What is claimed is:

1. A system for preparing a detailed material cutting specification for cutting material and fitting the cut material into a given area comprising:

converting means for converting a first set of visual indicia to a first set of data representing the coordinates of the given area;

storing means for containing the first set of data and a second set of data representing at least one dimensional characteristic of the material;

analyzing means for determining the first set of data as a function of the second set of data and automatically converting the first set of data into a third set of data representing all of the seam positions separating adjacent strips of material and the length of each strip of material; and converting means for changing the length of each strip and the seam positions between adjacent strips from the third set of data to a second set of visual indicia.

2. The system according to claim 1, wherein the means for defining dimensions of the given area employs a coordinate based system for defining the given area.

3. The system according to claim 1, further including means for considering patterned material in determining a proper layout for the material within the given area.

4. The system according to claim 3, wherein the means for defining dimensions employs a coordinate based system for defining the given area.

5. The system according to claim 3, wherein the means for considering patterned material evaluate the pattern repeat length in determining the proper layout for the materials within the given area.

6. The system according to claim 1, wherein said analyzing means includes a calculate routine which determines the proper placement of seams and fillers within the given area and a filler routine which calculates material necessary to cover filler spaces identified by the calculate routine.

7. The system according to claim 6, wherein the calculate routine and the filler routine maintain a summary of the material needed to cover the given area.

8. The system according to claim 6, wherein the calculate routine determines the proper placement of seams and fillers within the given area by analyzing the given area as a function of the width of the material.

9. The system according to claim 1, wherein said analyzing means determines the proper placement of seams and fillers within the given area by analyzing the given area as a function of the width of the material.

10. A method for preparing a detailed material cutting specification for cutting material and fitting the cut materials into a given area, comprising the steps of:

measuring dimensions of the given area to obtain a first set of visual indicia;

converting the first set of visual indicia to a second set of data representing the coordinates of the given area;

storing the first set of data and a second set of data representing at least one dimensional characteristic of the material;

analyzing the first set of data as a function of the second set of data and automatically converting the first set of data into a third set of data representing all of the seam positions separating adjacent strips of material and the length of each strip of material; and converting the length of each strip and the seam positions between adjacent strips from the third set of data to a second set of visual indicia.

11. The method according to claim 10, wherein said measuring step includes storing data regarding the dimensions of the periphery of the given area in the computer system and storing dimensions of the material in the computer system.

12. The method according to claim 10, wherein said analyzing step includes performing a calculate routine which determines the proper placement of seams and fillers within the given area.

13. The method according to claim 12, wherein said analyzing step further includes performing a filler routine which calculates material necessary to cover filler spaces identified by the calculate routine.

14. The method according to claim 12, wherein the calculate routine is initiated by identifying a starting point from which the proper material layout is identified.

15. The method according to claim 14, wherein the calculate routine moves from the starting point, and about the given area, to identify the placement of strips of the material and material fillers used in covering the given area with the material.

16. The method according to claim 10, including the additional step of considering patterned material in analyzing the dimensions of the given area as a function of the dimensions of the material to identify the placement of strips of the material and material fillers used in covering the given area with the material.

* * * * *